(12) United States Patent
Sachdev et al.

(10) Patent No.: US 11,738,749 B2
(45) Date of Patent: Aug. 29, 2023

(54) METHODS, SYSTEMS, AND APPARATUSES FOR SCENARIO-BASED PATH AND INTERVENTION ADAPTATION FOR LANE-KEEPING ASSIST SYSTEMS

(71) Applicant: GM GLOBAL TECHNOLOGY OPERATIONS LLC, Detroit, MI (US)

(72) Inventors: Jayant Sachdev, Toronto (CA); Reza Zarringhalam, Whitby (CA); Amir Takhmar, Toronto (CA); Jimmy Zhong Yan Lu, Markham (CA); Paul A. Adam, Milford, MI (US); Tetyana V. Mamchuk, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 395 days.

(21) Appl. No.: 17/092,967

(22) Filed: Nov. 9, 2020

(65) Prior Publication Data
US 2022/0144266 A1    May 12, 2022

(51) Int. Cl.
*B60W 30/12*    (2020.01)
*B60W 10/20*    (2006.01)
(Continued)

(52) U.S. Cl.
CPC ............ *B60W 30/12* (2013.01); *B60W 10/20* (2013.01); *B60W 30/02* (2013.01);
(Continued)

(58) Field of Classification Search
CPC ...... B60W 30/12; B60W 10/20; B60W 30/02; B60W 30/18163; B60W 40/072;
(Continued)

(56) References Cited

U.S. PATENT DOCUMENTS

| 2007/0203617 A1* | 8/2007 | Haug .................. B62D 15/025 701/1 |
| 2011/0015850 A1* | 1/2011 | Tange ................. B60T 8/17557 701/116 |

(Continued)

FOREIGN PATENT DOCUMENTS

| KR | 20170035206 A | * | 3/2017 | |
| WO | WO-2006027533 A1 | * | 3/2006 | ........... G05D 1/0212 |

*Primary Examiner* — Hunter B Lonsberry
*Assistant Examiner* — Daniel M. Robert
(74) *Attorney, Agent, or Firm* — Lorenz & Kopf LLP

(57) ABSTRACT

In various embodiments, methods, systems, and vehicle apparatuses are provided. A method for implementing a lane-keeping assist unit of a vehicle by receiving information of a plurality of road geometries, and driving scenarios wherein at least one driving scenario is combined with a target path that is parallel and biased from a lane center by a desired path offset, and a reference path for guiding the vehicle to merge with the target path; adapting the reference path with control based on a selected road geometry and driving scenario; adjusting the desired path offset by considering lane markings during an intervention for an inner curve, an outer curve and a straight road; controlling the vehicle trajectory for enabling the vehicle to track the reference path; exiting the intervention once a trajectory tracking performance by the vehicle is confirmed; and aborting once an instability of the trajectory tracking performance is confirmed.

15 Claims, 8 Drawing Sheets

(51) Int. Cl.
*B60W 30/18* (2012.01)
*B60W 40/08* (2012.01)
*B60W 40/072* (2012.01)
*B60W 60/00* (2020.01)
*B60W 30/02* (2012.01)
*B60W 10/18* (2012.01)

(52) U.S. Cl.
CPC .... *B60W 30/18163* (2013.01); *B60W 40/072* (2013.01); *B60W 40/08* (2013.01); *B60W 60/0013* (2020.02); *B60W 10/18* (2013.01); *B60W 2540/22* (2013.01); *B60W 2552/53* (2020.02)

(58) Field of Classification Search
CPC .. B60W 40/08; B60W 60/0013; B60W 10/18; B60W 2540/22; B60W 2552/53; B60W 30/025; B60W 30/182; B60W 2552/30; B60W 2552/00
See application file for complete search history.

(56) References Cited

U.S. PATENT DOCUMENTS

| | | | |
|---|---|---|---|
| 2012/0314055 A1* | 12/2012 | Kataoka | G08G 1/167 382/104 |
| 2013/0006473 A1* | 1/2013 | Buerkle | B62D 15/025 701/41 |
| 2014/0229068 A1* | 8/2014 | Ueyama | B60W 10/20 701/41 |
| 2016/0052547 A1* | 2/2016 | Kashiwai | B62D 15/021 701/41 |
| 2016/0221575 A1* | 8/2016 | Posch | B60W 30/14 |
| 2019/0039593 A1* | 2/2019 | Oyama | B60W 60/0051 |
| 2019/0071080 A1* | 3/2019 | Shimizu | G06T 7/12 |
| 2019/0202455 A1* | 7/2019 | Guecker | B60W 10/20 |
| 2020/0353918 A1* | 11/2020 | Goto | B60W 30/095 |
| 2021/0323574 A1* | 10/2021 | Yoo | G06T 7/70 |
| 2022/0144266 A1* | 5/2022 | Sachdev | B60W 30/12 |
| 2022/0161788 A1* | 5/2022 | Tamashima | B60W 30/12 |

* cited by examiner

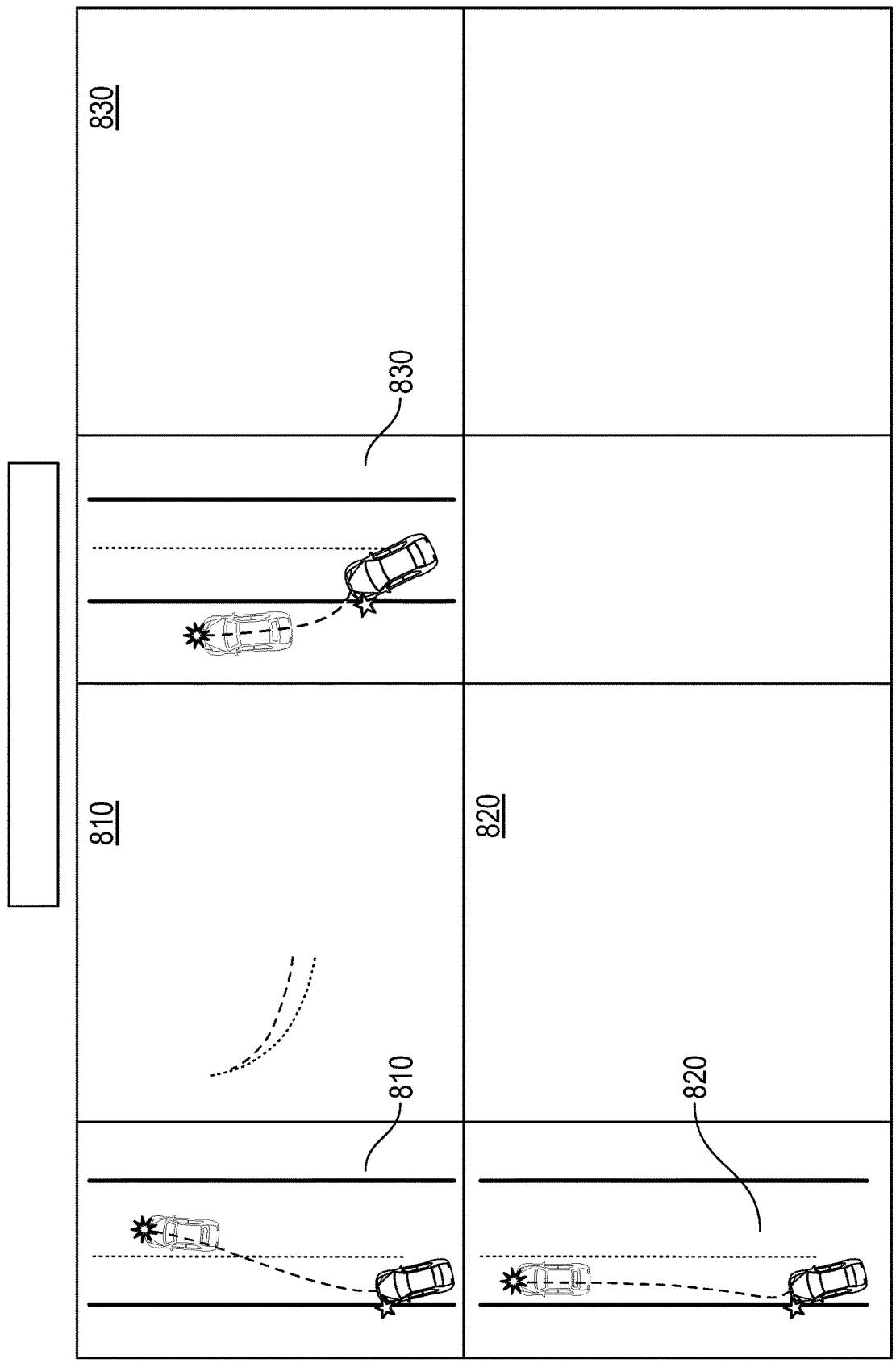

… (1) …

METHODS, SYSTEMS, AND APPARATUSES FOR SCENARIO-BASED PATH AND INTERVENTION ADAPTATION FOR LANE-KEEPING ASSIST SYSTEMS

INTRODUCTION

The technical field generally relates to lane-keeping assist methods, systems, and apparatuses and more particularly relates to methods, systems, and apparatuses for lane-keeping assist for a vehicle by adapting vehicle trajectories and interventions based upon road geometry and driving scenarios, controlling of intervention exits while considering trajectory tracking, and mitigating of over-correction and tracking anomalies.

Lane-keeping assist is an active-safety feature to assist the driver keeping the vehicle within the confines of a lane. It intervenes when it detects that the vehicle is about to cross the lane marker.

Traditional lane-keeping assist feature intervenes by steering the vehicle away from the lane marker, but without explicitly stabilizing the vehicle trajectory. It is desirable to provide a lane-keeping assist that intervenes by tracking the vehicle trajectory to a reference path.

Accordingly, it is desirable to provide systems and methods to improve lane-keeping assist by adapting the reference path through the addition of the desired offset to the center of the lane and interventions to road geometries and driving scenarios. Also, it is desirable to adapt the reference path and intervention criteria in lane-keeping systems to optimize driver comfort, feature consistency, and occupant safety.

It is desirable for intervention exit and abort based on stabilization criteria and for controlling vehicle until stability or instability can be confirmed. It is desirable for an intervention abort to mitigate over-correction and trajectory tracking anomalies.

Furthermore, other desirable features and characteristics of the present invention will become apparent from the subsequent detailed description and the appended claims, taken in conjunction with the accompanying drawings and the foregoing technical field and background.

SUMMARY

A method, system, and apparatus for lane-keeping assist for a vehicle by adapting of vehicle trajectories based upon road geometry, and driving scenario, controlling of intervention exits while considering trajectory tracking, and mitigating of over-correction and tracking anomalies are disclosed.

In one embodiment, a method for implementing a lane-keeping assist unit of a vehicle is provided. The method includes receiving, by the lane-keeping assist unit disposed of in the vehicle, predictions on if and when the vehicle will cross a lane marking, information of a plurality of road geometries, driving scenarios, a target path parallel to and biased from lane center by a desired path offset, and a reference path guiding the vehicle to merge with the target path; adapting, by the lane-keeping assist unit, the target path and an intervention based on a selected road geometry and driving scenario from the plurality of road geometries and driving scenarios; controlling, by the lane-keeping assist unit, the vehicle to track the reference path; exiting, by the lane-keeping assist unit, the intervention once a trajectory tracking performance by a current operating vehicle on the selected road geometry and driving scenario is confirmed; aborting, by the lane-keeping assist unit, once at least an instability of the trajectory tracking performance is confirmed; configuring, by the lane-keeping assist unit, a set of criteria for a desired path offset relative to lane center related to road geometries and intervention to enable consistency in operation of the lane-keeping assist unit wherein the set of criteria is related to the road geometries; and adjusting, by the lane-keeping assist unit, the target path by applying the desired path offset to the target path based on intervention side lane marking, during the intervention in an inner curve and in an outer curve.

In at least one embodiment, the road geometries and driving scenarios include attributes of a width of a road, a curvature of the road, and a side of the intervention relative to a direction of a curve of the road.

In at least one embodiment, the method includes applying, by the lane-keeping assist unit, the desired path offset to intervention side lane marking, during the intervention based on changes in road geometry.

In at least one embodiment, the method includes adapting the desired path offset and intervention exit criteria by the lane-keeping assist unit by biasing the target path toward the outer lane marker during a lane-keeping assist event in an outer curve; aligning the target path with the lane center during a lane-keeping assist event in an inner curve or on a straight road; controlling the vehicle to at least one specific target path adaptation of a plurality of specific target path adaptations during the lane-keeping assist event.

In at least one embodiment, the method includes the plurality of specific target path adaptations, which at least includes a straight path adaptation, a curve path adaptation, a lane split adaptation, a lane merge adaptation, a transition adaptation, a lane widening adaptation, an s-curve adaptation, and a lane narrowing adaptation.

In at least one embodiment, the method includes adapting a set of criteria for the target path, intervention, and control by the lane-keeping assist unit by adjusting the target path and vehicle control so that the vehicle only moves away from an active lane marking towards a lane center as a result of a change in road geometry in the lane-keeping assist event.

In at least one embodiment, the method includes adapting the set of criteria for the target path and the intervention by the lane-keeping assist unit by adjusting the desired path offset relative to lane center to have a maximum vehicle offset relative to the lane markings for wider roads for enhanced vehicle occupant comfort.

In at least one embodiment, the method includes adapting the set of criteria for the target path and the intervention by the lane-keeping assist unit by adjusting the target path to minimize lateral jerk and lateral acceleration;

In at least one embodiment, the method includes controlling the abort of the intervention to mitigate overcorrection and trajectory tracking anomalies in the trajectory tracking the performance of the LKAS (Lane Keeping Assist System) in the current operating vehicle.

In at least one embodiment, a system is provided. The system includes a processing unit disposed of in a vehicle including one or more processors configured by programming instructions encoded on non-transient computer-readable media, the processing unit configured to: receive information of a plurality of road geometries, driving scenarios and a reference path back to the lane center and aligned with the target path; adapt the target path and an intervention based on a selected road geometry and driving scenario from the plurality of road geometries and driving scenarios; exit the intervention once the trajectory tracking performance by the LKAS on the selected road geometry and driving scenario is confirmed; abort once at least an instability of the trajectory tracking of performance is confirmed; configure a set of criteria for a desired path offset considering the lane center and lane markers related to road geometries for the target path and intervention to enable consistency in operation of the lane-keeping assist unit wherein the set of criteria is related to the road geometries; adjust the target path by application of the desired path offset relative to lane center by the lane-keeping assist unit in an inner curve, straight and in an outer curve LKAS event.

In at least one embodiment, the system includes the road geometries and driving scenarios, including attributes of the width of a road, a curvature of the road, and the side of the intervention relative to a direction of a curve of the road.

In at least one embodiment, the system includes the processing unit configured to: apply and adapt the desired path offset considering the lane center and lane markers in the intervention based on changes in road geometry and driving scenario.

In at least one embodiment, the system includes the processing unit configured to: adapt the target path offset considering the lane center and lane markers, intervention criteria and control to track an outer curve during an outer curve lane-keeping assist event; return of the vehicle to a lane center while stabilizing the vehicle with the target path curvature during an inner-curve or straight lane-keeping assist event; adapt the vehicle to at least one specific target path adaptation of a plurality of specific target path adaptations during the lane-keeping assist event.

In at least one embodiment, the system includes the plurality of specific target path adaptations that at least includes: a straight path adaptation, a curve path adaptation, a lane split adaptation, a lane merge adaptation, a transition adaptation, a lane widening adaptation, an s-curve adaptation, and a lane narrowing adaptation.

In at least one embodiment, the system includes adapting a set of criteria for the target path and the intervention by the lane-keeping assist unit by adjusting a target path so that the vehicle only moves away from an active lane marking towards a lane center as a result of a change in road geometry in the lane-keeping assist event.

In at least one embodiment, the system includes the processor configured to: adapt the set of criteria for the target path and the intervention by adjusting the desired path offset from lane center to have a maximum vehicle offset from the active lane marking for wider roads for enhanced vehicle occupant comfort and to minimize lateral jerk and lateral acceleration; control the abort of the intervention to mitigate overcorrection and trajectory tracking anomalies in the trajectory tracking the performance of the current operating vehicle.

In yet another at least one embodiment, a vehicle apparatus is provided. The vehicle apparatus includes a lane-keeping assist unit including one or more processors and non-transient computer-readable media encoded with programming instructions, the lane-keeping assist unit is configured to: receive information of a plurality of road geometries, driving scenarios and a reference path back to and aligned with the target path; adapt the target path and an intervention based on a selected road geometry and driving scenario from the plurality of road geometries and driving scenarios; exit the intervention once a trajectory tracking performance by a current operating vehicle on the selected road geometry, and driving scenario is confirmed; abort once instability of the trajectory tracking of performance is confirmed; configure a set of criteria for a desired path offset from lane center, considering the lane center and lane markers, related to road geometries for the target path and intervention to enable consistency in operation of the lane-keeping assist unit, wherein the set of criteria is related to the road geometries; adjust the target path during the intervention by the lane-keeping assist unit in an inner curve and in an outer curve during the current operation of the vehicle.

In at least one embodiment, the vehicle apparatus includes the lane-keeping unit configured to: adapt a set of criteria for the target path and the intervention by adjusting a target path so that the vehicle only moves away from an active lane marking towards a lane center as a result of a change in road geometry in the lane-keeping assist event; adapt the set of criteria for the target path and the intervention by adjusting the desired path offset to have a maximum vehicle offset from the active lane marking for wider roads for enhanced vehicle occupant comfort; adapt the set of criteria for the target path and the intervention by adjusting the target path to minimize lateral jerk and lateral acceleration; control the abort of the intervention to mitigate overcorrection and trajectory tracking anomalies in the trajectory tracking the performance of the LKAS in the current operating vehicle.

In at least one embodiment, the vehicle apparatus includes the lane-keeping unit configured to: adapt the target path during the intervention and based on changes in road geometry and driving scenarios; and adapt the desired path offset and intervention by biasing the target path toward the outer lane marker during a lane-keeping assist event in an outer curve, aligning the target path with the lane center during a lane-keeping assist event in an inner curve or on a straight road, and adapting the vehicle to at least one specific target path adaptation of a plurality of specific target path adaptations during the lane-keeping assist event.

In at least one embodiment, the vehicle apparatus includes the plurality of specific target path adaptations for each vehicle offset at least includes a straight path adaptation, a curve path adaptation, a lane split adaptation, a lane merge adaptation, a transition adaptation, a lane widening adaptation, an s-curve adaptation, and a lane narrowing adaptation.

BRIEF DESCRIPTION OF THE DRAWINGS

The exemplary embodiments will hereinafter be described in conjunction with the following drawing figures, wherein like numerals denote like elements, and wherein:

FIG. 8 illustrates diagrams of intervention aborts to mitigate overcorrection and trajectory anomalies of the lane-keeping assist system in accordance with an embodiment.

DETAILED DESCRIPTION

Figure 1:
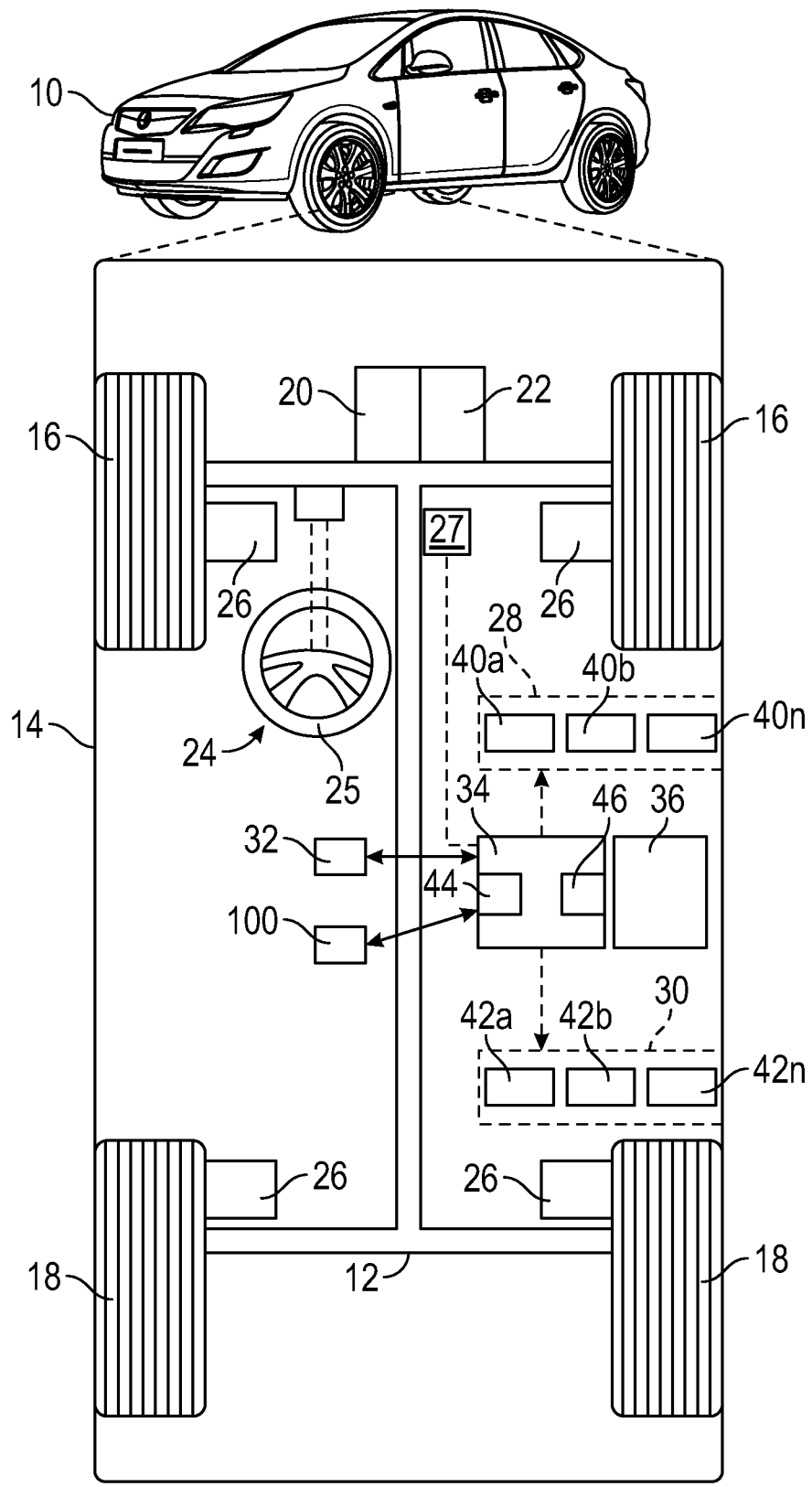
FIG. 1 illustrates a block diagram depicting an example vehicle that may include a processor for the path-based lane-keeping assist of vehicle operations implemented by a lane-keeping assist system in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

Autonomous and semi-autonomous vehicles are capable of sensing their environment and navigating based on the sensed environment. Such vehicles sense their environment using multiple types of sensing devices such as optical cameras, radar, lidar, other image sensors, and the like. In such vehicles, the sensed data can be fused together with map data and vehicle sensors (Inertial Measurement unit, vehicle speed sensors, etc.) to identify and track vehicle trajectory tracking performance based on road geometry.

The trajectory planning or generation for an autonomous vehicle can be considered as the real-time planning of the vehicle's transition from one feasible state to the next, satisfying the vehicle's limits based on vehicle dynamics and constrained by the navigation lane boundaries and traffic rules, while avoiding, at the same time, obstacles including other road users as well as ground roughness and ditches.

In various exemplary embodiments, the present disclosure describes systems and methods using behavior models for providing functionality on top of sensor tracking and correcting the position of a vehicle to better align the vehicle with various different road geometries by processing sensor tracks and classifying road geometries.

FIG. 1 illustrates a block diagram depicting an example vehicle that may include a processor for adapting the target path and interventions based on driving scenarios, for adapting the target path and intervention criteria in a LKAS in optimizing driver comfort with feature consistency and occupant safety, and for intervention exit and abort actions based on stabilization criteria based on controlling vehicle until stability or instability state can be confirmed by the LKAS 100. In general, there is an adaptation of the target path and interventions based on road geometries and driving scenarios that include the width of the road; curvature of the road; the side of the intervention relative to the direction of the curve; and the changes in road geometry during the intervention by the LKAS (or simply "system") 100. The system 100 may abort an intervention when considering the performance of the vehicle 10 trajectory tracking. The abort action can occur once instability in the vehicle 10 operation can be confirmed or once the stability is determined around the local minima amount, which is outside the desired stability margins predetermined for vehicle 10 operation and this stability can be confirmed. Also, the system 100 may detect vehicle operations that result in over-corrections to a target trajectory as well as other trajectory tracking anomalies that can occur. The system 100 is configured for adjusting the target path. The vehicle 10 only moves away from the active lane marking towards the lane center in the event that road geometry changes mid-event in a roadway during vehicle 10 operations. The system 100 is configured for the implementation of target path adjustments based on an inner curve and outer curve intervention and to enforce a max offset of the vehicle 10 location from the centerline or target line in the case of wide roads for increased comfort in the vehicle 10 operations.

As depicted in FIG. 1, the vehicle 10 generally includes a chassis 12, a body 14, front wheels 16, and rear wheels 18. The body 14 is arranged on chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car. Still, it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

For example, the system 100 may include any number of additional sub-modules embedded within the controller 34, which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
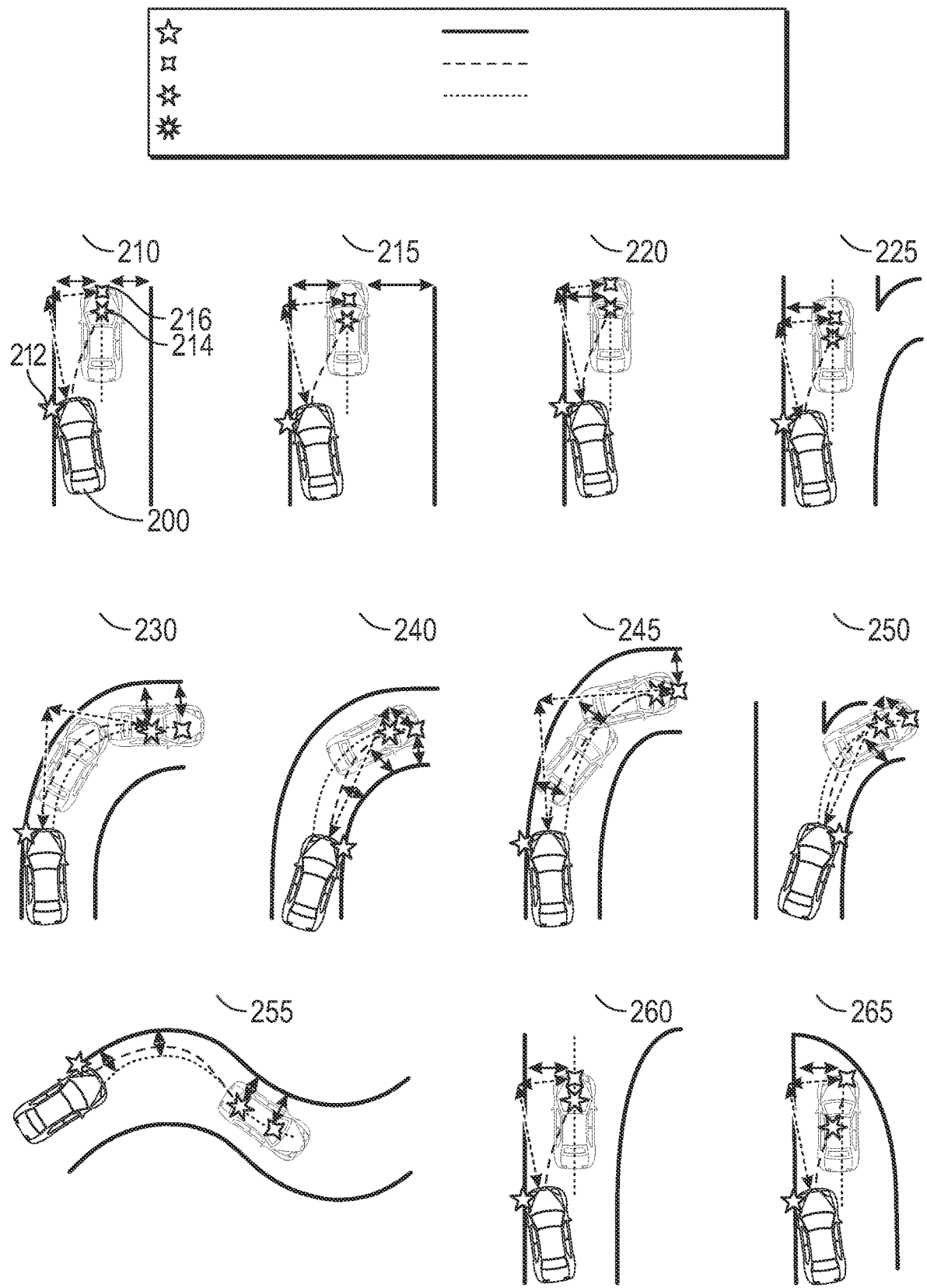
FIG. 2 illustrates a set of exemplary diagrams of various lane-keeping assist behavior models for implementing target path and intervention adaptations with different road geometries and driving scenarios of the lane-keeping assist system in accordance with an exemplary embodiment.

FIG. 2 illustrates an exemplary diagram of the scenario and road geometry-based path and intervention adaptation of the lane-keeping assist system in accordance with an embodiment. In FIG. 2, the exemplary diagrams of the scenario and road geometry include a regular straight road 210, a wide straight road 215, a single lane 220, a lane split and straight side 225, a mid-outer curve 230, a mid-inner curve 240, a straight and entry to a curve 245, a lane split and exit side 250, an s-curve 255, a lane widening 260 and a lane narrowing 265. In the regular straight road 210, there is an initial start invention point 212 for the vehicle 200 and an exit intervention point 214 for a merge point 216 on the centerline. Likewise, the other road geometries have indicated a start invention point, an exit invention point, and a merge point respectively for the vehicle shown in the other road geometries of the wide straight road 215, the single lane 220, the lane split and straight side 225, the mid-outer curve 230, the mid-inner curve 240, the straight and entry to the curve 245, the lane split and exit side 250, the s-curve 255, the lane widening 260 and the lane narrowing 265.

Figure 3:
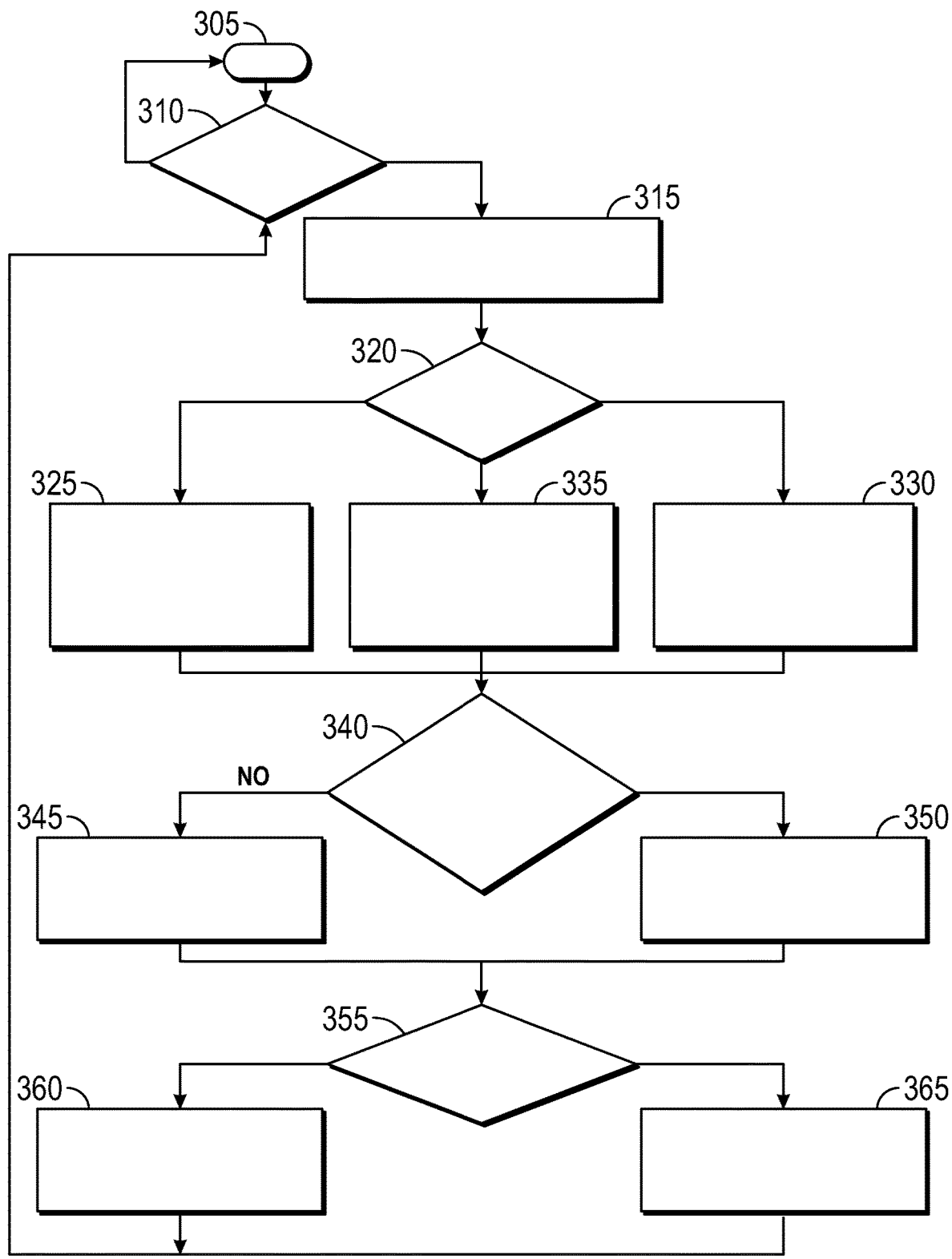
FIG. 3 illustrates an exemplary flowchart for implementing lane-keeping assist behavior models for target path adaptations with different road geometries and driving scenarios of the LKAS in accordance with an exemplary embodiment.

FIG. 3 illustrates a flow diagram of the target path adaptation as part of the LKAS in accordance with an embodiment. In FIG. 3, at step 305, the process is initiated. Then at step 310, a determining step is executed by the lane-keeping assist system as to whether the intervention mode is active? If yes, then at task 315, the offset required is determined in order to keep the vehicle on the lane marker. This is determination performed by first determining at step what type of road the vehicle is on? The road type is determined by one of the road types shown in FIG. 2 as an example. Next, if the road type is a "curved road," then the vehicle position on the curve is determined. The vehicle operation could be for a curved road on the inner side of the curve or for a curved road on the outer side of the curve. If the vehicle is on the inner side of the curve of the curved road, then at step 325, "a raw offset from lane center" is calculated as a function of road inner curvature offset adjustment, vehicle speed modifier, and lane width. If the vehicle is on the outer side of the curve of the curved road, then at step 330, "a raw offset from lane center" is calculated as a function of road outer curvature offset adjustment, vehicle speed modifier, and lane width. That is, the function is applied by tracking an outer curve in an outer curve during a lane-keeping assist event. Then, after the curve ends, returning the vehicle to a lane center while stabilizing the vehicle with respect to the lane center during the lane-keeping assist event; and adapting the vehicle to at least one specific target path adaptation of a plurality of specific target path adaptations during the lane-keeping assist event.

Alternatively, if the vehicle is on a straight road, then at step 335, "a raw offset from lane center" is calculated as a function of straight road-specific "offset adjustment", vehicle speed modifier, and lane width. At step 340, a determination is made by the lane-keeping assist system if the raw offset calculated has increased; that is, the lane center offset is greater than a previous value (i.e., raw offset from lane center increases from previous value).

If it is an affirmative determination, that "yes" there is an increase from the previous value of the raw offset from the center lane, then the flow proceeds to step 350, where the final absolute offset from the lane center equals the previous final offset from the lane center plus allowed adjustment for offset increase (i.e., Final absolute offset from lane center=Previous final offset from lane center+allowed adjustment for offset increase). Alternately, if it is a negative determination that "NO" there is no increase from the previous value of the raw offset from the center lane, then the flow proceeds to step 345, where the final absolute offset from the lane center equals the raw offset from the lane center (i.e., Final absolute offset from lane center=Raw offset from lane center of step 325-330). Once the final absolute offset is determined, then at step 355, the lane-keeping assist system decides which side of the centerline to apply the offset invention to change the trajectory of the vehicle to move in a direction to the outside or to the inside of the centerline (i.e., which side of intervention at step 355 is applied). If it is a "right" determination, then the flow proceeds to step 360, where the final desired path offset from the lane center is set to equal a reduction (negative value) or a minus value of the final (desired) offset from the lane center (i.e., desired path offset=−final offset from the lane center). If it is a "left" determination, then flow proceeds to step 365, where the final desired path offset is set to equal an increase (positive value) or a plus value of the final (desired) offset from the lane center (i.e., desired path offset=+final offset from the lane center).

Figure 4A:
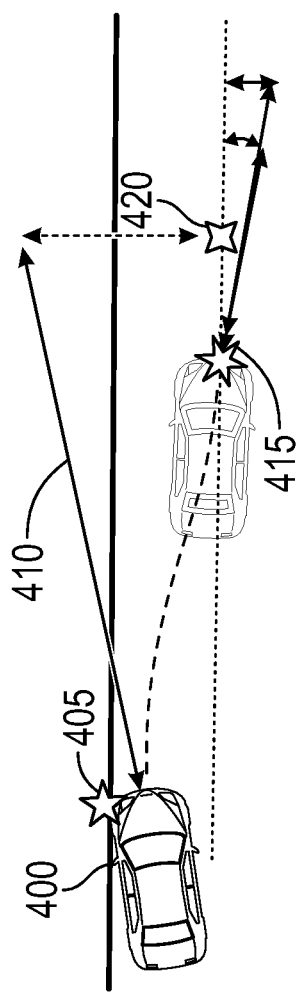
FIGS. 4A and 4B are diagrams of intervention adaptation and exit, and over-correction and intervention abort of the lane-keeping assist system in accordance with an embodiment.
Figure 4B:
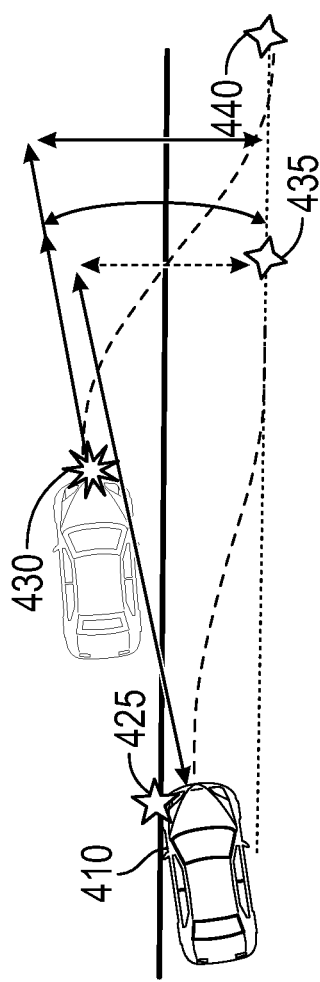

FIGS. 4A and 4B are diagrams of intervention adaptation and exit, and over-correction and intervention abort of the lane-keeping assist system in accordance with an embodiment. In FIG. 4A the vehicle 400, the lane-keeping assist system begins an intervention at 405, for the vehicle 400 heading in the $e_\varphi$ heading. The intervention is exited at 415, which is the exit point of the invention when the vehicle 400 is at the desired offset from the lane center. The merge point 420 for the vehicle at $LA_{merge}$ is the point where the calculated reference path reaches the desired offset from the lane center and matches the heading of the lane markings. FIG. 4B shows a trajectory tracking anomaly for vehicle 410 that results in the start invention point 425 where the lane-keeping assist system is executed, and unknown issues causing the vehicle to not follow the target path back to the desired merge point 435 but instead drift out to 430, at which point trajectory tracking instability can be detected, and intervention shall be aborted.

Figure 5A:
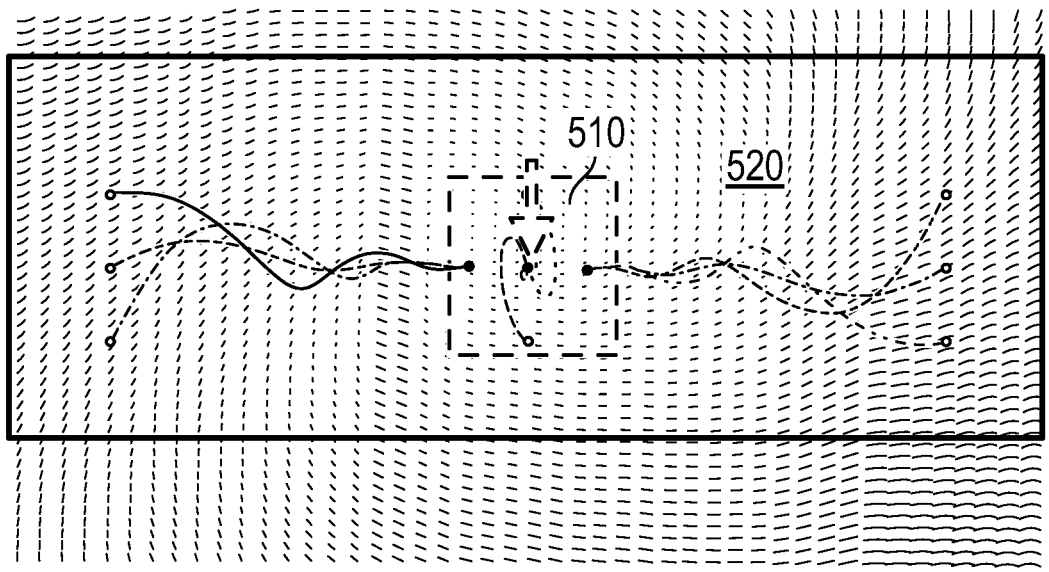
FIGS. 5A and 5B are exemplary graphs of cost functions for control and input of vehicle models for invention exit and abort based on stabilization criteria for the LKAS in accordance with an embodiment.
Figure 5B:
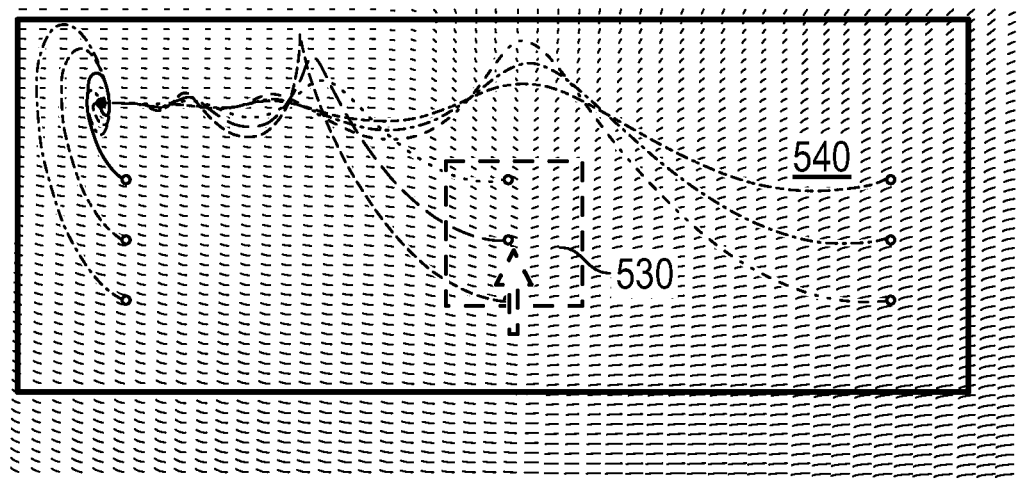

FIGS. 5A and 5B are exemplary graphs of cost functions for control and input of vehicle models for invention exit and abort based on stabilization criteria for the lane-keeping assist system in accordance with an embodiment.

The cost function is based on a control input and vehicle model that can define a region of stability for control exit and a region of instability for control abort. The assist intervention either exits or aborts based on the stabilization criteria that defines the regions of stability and instability. The vehicle is controlled until stability or instability is confirmed.

Also, the intervention abort is to mitigate over-correction and trajectory tracking anomalies that can occur. The cost function is defined for X vehicle states with $e_y$ defined as the lateral position error, $\dot{e}_y$ defined as the derivative of the lateral position error, $e_\varphi$ defined as the heading error, and $\dot{e}_y$ defined as the derivative of heading error with X=[$e_y$; $\dot{e}_y$; $\dot{e}_\varphi$; $\dot{e}_\varphi$] that determines when to initiate the intervention and when to abort based on when the output of the cost function is maintained within or outside of the stability region.

The B input matrix with Velocity $V_x$, base offset $l_f$, C curvature look-up, offset adjustment $l_r$; is defined as:

$$B = \left[0; -\frac{2C_f l_f - 2C_r l_r}{mV_x} - V_x; 0; \frac{2C_f l_f^2 - 2C_r l_r^2}{I_z V_x}\right]$$

The K gains and a delta δ are included in the cost function where the cost function f(X) is based on the vehicle states X of the vehicle position and heading relative to the desired path:

$$f(X) = \left[X_2; -\frac{2C_f + 2C_r}{mV_x}X_2 + \frac{2C_f + 2C_r}{m}X_3 + \frac{2C_r l_r - 2C_f l_f}{mV_x}X_4 + \right.$$
$$\frac{2C_f}{m}[-K_1X_1 - K_2X_2 - K_3X_3 - K_4X_4] + B_2\rho_{mod}; X_4;$$
$$-\frac{2l_f C_f - 2l_r C_r}{I_z V_x}X_2 + \frac{2l_f C_f - 2l_r C_r}{I_z}X_3 - \frac{2(l_f^2)C_f + 2(l_r^2)C_r}{I_z V_x}X_4 +$$
$$\left.\frac{2l_f C_f}{I_z}[-K_1X_1 - K_2X_2 - K_3X_3 - K_4X_4] + B_4\rho_{road}\right]$$

With the delta, δ, δ=[$K_1X_1+K_2X_2+K_3X_3+K_4X_4$]

In FIG. 5A, for the straight roadway, the stability region 510 and the instability region 520 are shown. In FIG. 5B, for the curved roadway, the stability region 530 and the instability region 540 are shown.

Figure 6:
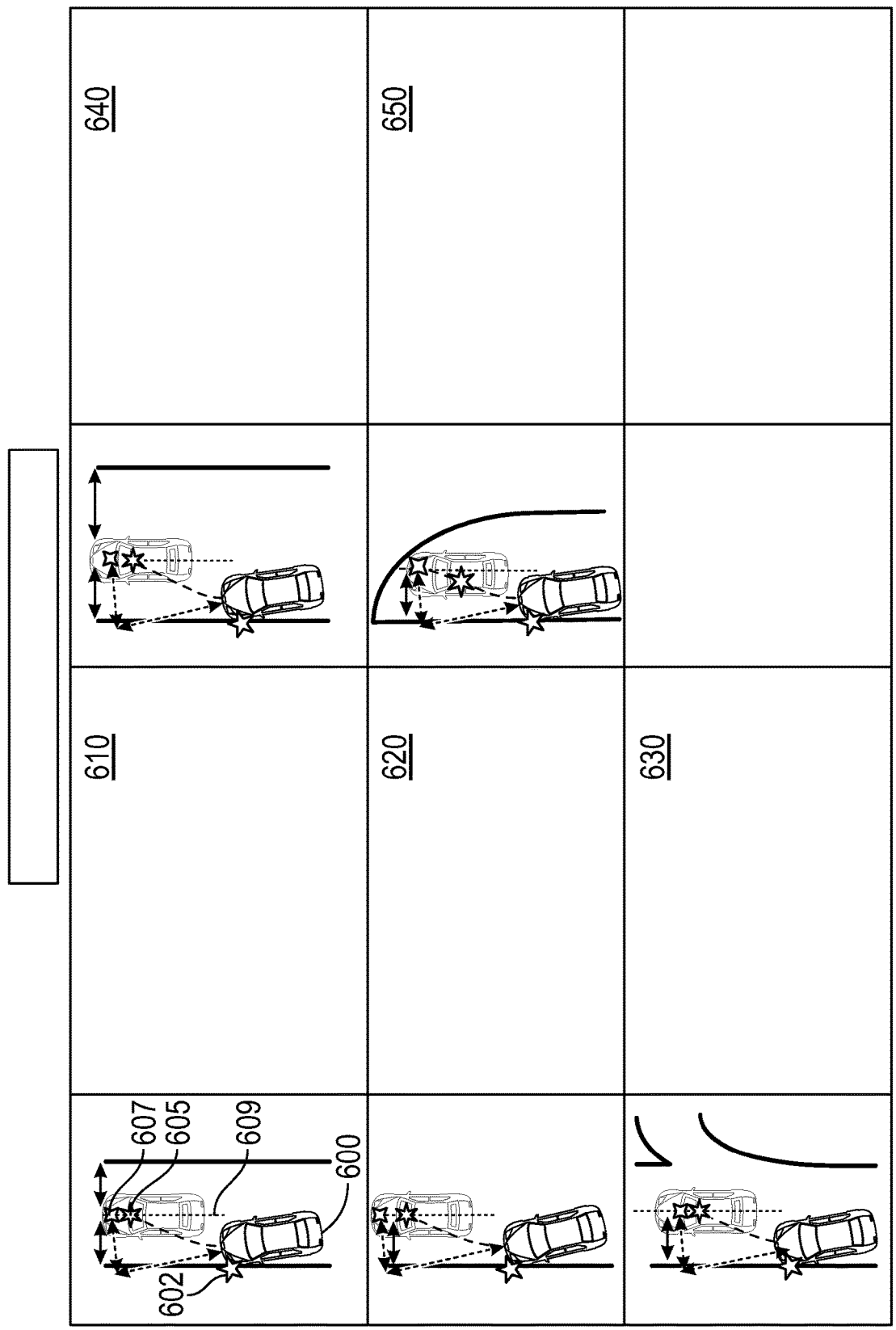
FIG. 6 illustrates diagrams of straight road adaptations of the target path and intervention based on road geometries and driving scenarios of the LKAS in accordance with an embodiment.

FIG. 6 illustrates diagrams of straight roads adapting the target path and intervention based on road geometries and driving scenarios of the lane-keeping assist system in accordance with an embodiment. In FIG. 6, for a normal straight road 610, the lane center is anchored between the left and right lane edges. The intervention pulls vehicle 600 away from the lane edge and stabilizes the vehicle 600 with the target path 609. The start of the intervention is at point 602. The LKAS intervenes when the system detects the vehicle is about to cross a lane marking and steers the vehicle to track the reference path. The lane-keeping assist system exits the intervention at point 605 when in this case, the vehicle 600 reaches the desired offset and heading with respect to the target path 609 (i.e., when the vehicle 600 is correctly located within an offset distance from the centerline). The merge point 607 is the control point to which the LKAS tries to align the vehicle with the target lane 609. The single detected lane edge 620 is a use case when the target path is estimated by the lane-keeping assist system using a nominal preset road width. Here the lane-keeping assist system is initiated at the respective start initiate point for activation until the exit point. The target path is estimated based on using the nominal preset road width. The splitting lanes 630 is where the target lane is anchored to the lane marking, where the intervention point 602 is triggered. The wide straight road 640 is when the target path is anchored at a maximal present distance away from the intervention side. The narrowing road 650 is when the invention aborts if the road width narrows beyond a critical threshold.

Figure 7:
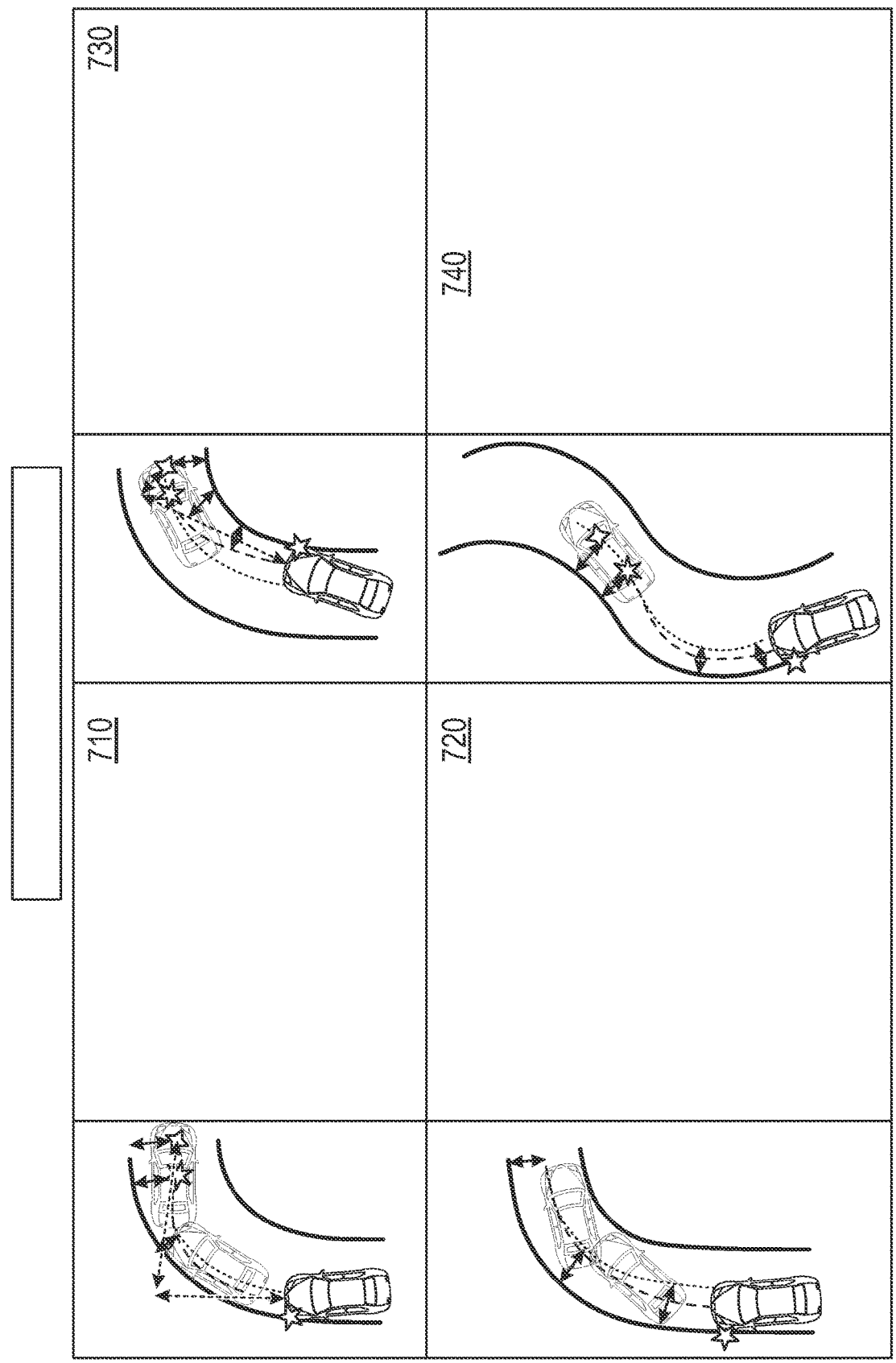
FIG. 7 illustrates diagrams of curved road adapt adaptations of the target path and intervention based on road geometries and driving scenarios of the LKAS in accordance with an embodiment.

FIG. 7 illustrates diagrams of curved roads adapting the target path and intervention based on road geometries and driving scenarios of the lane-keeping assist system in accordance with an embodiment. In FIG. 7, the curved road intervention 710, when intervention occurs on the outer edge of a curve, the target path is adapted toward the road edge through the configuration of the desired lane offset. Intervention persists until the road transitions to straight, where-upon the target path adaptation and exit criteria for the straight road apply. The straight road onto curve 720 if a straight road transition to a curve while intervention control is active, the target path may only increase offset toward the lane edges by an allowed adjustment for offset increase. The inner curve intervention 730 is when intervention occurs on the inner lane edge of a curve; the desired lane offset from the road center is based on inner curvature offset adjustment, vehicle speed modifier, and lane width (i.e., step 325 of FIG. 2) The intervention control ends as soon as the vehicle is stabilized. The s-curve 740 is an s-curve of an initial outer curve intervention that results in the desired path offset towards the road edge. As the curvature flips, the target path is brought back to the road center. The intervention control ends as soon as the vehicle is stabilized.

FIG. 8 illustrates diagrams of intervention aborts to mitigate overcorrection and trajectory anomalies of the lane-keeping assist system in accordance with an embodiment.

In FIG. 8, the intervention abort 810 for an overshoot is an exit if the vehicle overshoots the target path. The intervention abort 820 for long control is an exit intervention if the vehicle is in an intervention for a long period of time. The intervention abort 830 for road excursion would be an exit intervention if the vehicle crossed significantly over the lane edge.

It should be appreciated that process of FIGS. 1-8 may include any number of additional or alternative tasks, the tasks shown in FIGS. 1-8 need not be performed in the illustrated order and process of the FIGS. 1-8 may be incorporated into a more comprehensive procedure or process having additional functionality not described in detail herein. Moreover, one or more of the tasks shown in FIGS. 1-8 could be omitted from an embodiment of the process shown in FIGS. 1-8 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for implementing a lane-keeping assist system of a vehicle, the lane-keeping assist system having a processor, the method comprising:
   receiving, by the lane-keeping assist system disposed in the vehicle, information of a plurality of road geometries, and driving scenarios wherein at least one driving scenario is combined with a target path that is parallel and biased from a lane center by a desired path offset, and a reference path for guiding the vehicle to merge with the target path;
   adapting, by the lane-keeping assist system, the reference path with vehicle control based in part on a selected road geometry and driving scenario from information of the plurality of road geometries and driving scenarios;
   adjusting, by the lane-keeping assist system, the desired path offset by considering lane markings, during an intervention by the lane-keeping assist system in road geometries that comprise an inner curve, an outer curve and a straight road;
   controlling, by the lane-keeping assist system, a vehicle trajectory for enabling the vehicle to track the reference path;
   exiting, by the lane-keeping assist system, the intervention once a trajectory tracking performance by the vehicle on the selected road geometry and driving scenario is confirmed; and
   aborting, by the lane-keeping assist system, once at least an instability of the trajectory tracking performance is confirmed, wherein:
   the information of the plurality of road geometries and driving scenarios comprise in part attributes of a width of a road, a curvature of the road, and a side of the intervention relative to a direction of a curve of the road;
   the method further comprises adapting the desired path offset, by the lane-keeping assist system, by:
      biasing the target path toward an outer lane marker during a lane-keeping assist event in an outer curve;
      aligning the target path with the lane center during a lane-keeping assist event on a straight road; and
      adapting the target path to at least one specific target path adaptation of a plurality of specific target path adaptations during the lane-keeping assist event; and
   the plurality of specific target path adaptations at least comprise a straight path adaptation, a curve path adaptation, a lane split adaptation, a lane merge adaptation, a transition adaptation, a lane widening adaptation, an s-curve adaptation, and a lane narrowing adaptation.

2. The method of claim 1, further comprising:
adapting a set of criteria for the target path and vehicle control by the lane-keeping assist system by adjusting the desired path offset so that the vehicle moves away from an active lane marking towards the lane center due to a change in road geometry in the lane-keeping assist event.

3. The method of claim 1, further comprising:
adapting the set of criteria for the target path and vehicle control by the lane-keeping assist system by:
   adjusting the target path to have an increased vehicle offset relative to an active lane marker for roads with widths that are larger than a nominal preset road width for enhanced vehicle occupant comfort; and
   adjusting the target path to minimize lateral jerk and lateral acceleration.

4. The method of claim 1, further comprising:
controlling the vehicle trajectory to track the reference path by commanding a steering system of the vehicle, until an intervention exit criteria is confirmed.

5. The method of claim 1, further comprising:
adapting an intervention exit criteria by the lane-keeping assist system by:
   exiting the intervention when the vehicle trajectory is stabilized with respect to the target path and tracking the reference path during a lane-keeping assist event either on a straight road or in an inner curve; and holding the intervention and tracking the reference path during a lane-keeping assist event in an outer curve.

6. The method of claim 1, further comprising:

aborting the intervention to mitigate overcorrection and trajectory tracking anomalies in the trajectory tracking performance of the vehicle.

7. A system comprising:

a processing unit configured to control a trajectory of a vehicle, the processing unit comprising one or more processors configured by programming instructions encoded on non-transient computer-readable media, the processing unit configured to:

receive information of a plurality of road geometries and driving scenarios wherein at least one driving scenario is combined with a target path parallel and biased from a lane center by a desired path offset and a reference path for guiding the vehicle to merge with the target path;

adapt the reference path with vehicle control based in part on a selected road geometry and driving scenario from information of the plurality of road geometries and driving scenarios;

adjust the desired path offset by considering lane markings during an intervention, by the processing unit in road geometries that comprise an inner curve, an outer curve and a straight road;

control a vehicle trajectory for enabling the vehicle to track the reference path;

exit the intervention once a trajectory tracking performance by the vehicle on the selected road geometry and driving scenario is confirmed;

abort the intervention once at least an instability of a trajectory tracking of performance by the vehicle is confirmed; and adapt a set of criteria for the target path and control of the trajectory of the vehicle by adjusting the desired path offset for roads with widths that are larger than a nominal preset road width for enhanced vehicle occupant comfort and to minimize lateral jerk and lateral acceleration.

8. The system of claim 7, wherein the information of the plurality of road geometries and driving scenarios comprise in part attributes of a width of a road, a curvature of the road, and a side of the intervention relative to a direction of a curve of the road.

9. The system of claim 7, further comprising:

the processing unit configured to:

adapt the desired path offset and vehicle control to:

bias the target path toward an outer lane marker during a lane-keeping assist event in an outer curve;

align the target path with the lane center during a lane-keeping assist event on a straight road; and adapt the target path to at least one specific target path adaptation of a plurality of specific target path adaptations during the lane-keeping assist event.

10. The system of claim 9, wherein the plurality of specific target path adaptations and intervention exit criteria at least comprises a straight path adaptation, a curve path adaptation, a lane split adaptation, a lane merge adaptation, a transition adaptation, a lane widening adaptation, an s-curve adaptation, and a lane narrowing adaptation.

11. The system of claim 7, further comprising:

the processing unit configured to:

adapt a set of criteria for the target path and vehicle control by adjusting the desired path offset so that the vehicle only moves away from an active lane marking towards the lane center due to a change in road geometry in the lane-keeping assist event.

12. The system of claim 7, further comprising:

the processing unit configured to:

control the vehicle trajectory to track the reference path by commanding a steering system of the vehicle, until an intervention exit criteria is confirmed;

exit the intervention when the vehicle trajectory is stabilized and tracking the reference path during a lane-keeping assist event on a straight road or in an inner curve;

hold the intervention and track the reference path during a lane-keeping assist event in an outer curve; and control the abort of the intervention to mitigate overcorrection and trajectory tracking anomalies in the trajectory tracking performance of the vehicle.

13. A vehicle apparatus, comprising a lane-keeping assist system comprising one or more processors and non-transient computer-readable media encoded with programming instructions, the lane-keeping assist system is configured to:

receive information of a plurality of road geometries and driving scenarios combined with a target path that is parallel and biased from a lane center by a desired path offset and a reference path for providing guidance for the vehicle to merge with the target path;

adapt the reference path with vehicle control based on a selected road geometry and driving scenario from information of the plurality of road geometries and driving scenarios;

adjust a desired path offset by considering lane markings during the intervention for road geometries comprising an inner curve, an outer curve and a straight road;

control a vehicle trajectory for enabling the vehicle to track the reference path;

exit the intervention once a trajectory tracking performance by the vehicle on the selected road geometry and driving scenario is confirmed; and abort the intervention once at least an instability of the trajectory tracking performance is confirmed; and further comprising a lane-keeping assist system configured to:

adapt a set of criteria for the target path and control a vehicle trajectory for enabling the vehicle to adjust the desired path offset so that the vehicle moves away from an active lane marking towards a lane center as a result of a change in road geometry in the lane-keeping assist event;

adapt the set of criteria for the target path and vehicle control by adjusting the desired path offset to have a maximum vehicle offset for roads with widths that are larger than a nominal preset road width for enhanced vehicle occupant comfort;

adapt the set of criteria for the target path and vehicle control to minimize lateral jerk and lateral acceleration; and abort the intervention to mitigate overcorrection and trajectory tracking anomalies in the trajectory tracking performance of the vehicle.

14. The vehicle apparatus of claim 13, wherein the lane-keeping assist system is configured to:

adapt the target path during the intervention based on changes of road geometries; and adapt the target path and vehicle control by biasing the target path toward an outer lane marker during a lane-keeping assist event in an outer curve, aligning the target path with the lane center during a lane-keeping assist event of on a straight road, and adapting the vehicle to at least one specific target path adaptation of a plurality of specific target path adaptations during the lane-keeping assist event.

15. The vehicle apparatus of claim 14, wherein the plurality of specific target path adaptations at least comprises a straight path adaptation, a curve path adaptation, a lane split adaptation, a lane merge adaptation, a transition adaptation, a lane widening adaptation, an s-curve adaptation, and a lane narrowing adaptation.

* * * * *